United States Patent

Koske et al.

[11] Patent Number: 5,327,294
[45] Date of Patent: Jul. 5, 1994

[54] EXTERNAL MIRROR FOR VEHICLE

[75] Inventors: Jörg-Uwe Koske, Simmozheim; Volker Nickel, Vöhringen; Robert Schwed, Stuttgart; Richard Merz, Starzach; Arnold Klimas, Sindelfingen, all of Fed. Rep. of Germany

[73] Assignee: Mercedes-Benz AG, Fed. Rep. of Germany

[21] Appl. No.: 943,487

[22] Filed: Sep. 11, 1992

[30] Foreign Application Priority Data

Sep. 11, 1991 [DE] Fed. Rep. of Germany ....... 4130176

[51] Int. Cl.[5] .............................................. G02B 7/182
[52] U.S. Cl. ..................................... 359/872; 359/871; 248/478; 248/479; 248/480
[58] Field of Search ............... 359/841, 871, 872, 881; 248/477, 478, 479, 480, 488

[56] References Cited

U.S. PATENT DOCUMENTS 4,892,401 1/1990 Kittradge et al. ................ 359/871
4,991,814 2/1991 Schmidt et al. .
4,998,814 3/1991 Perry ............................... 359/872

FOREIGN PATENT DOCUMENTS 8105079 6/1981 Fed. Rep. of Germany .
3748759 7/1984 Fed. Rep. of Germany .
3923932 1/1991 Fed. Rep. of Germany .
2327893 5/1977 France .
2347231 11/1977 France .
2671036 7/1992 France .
0244639 12/1985 Japan ................................... 359/877
2193474 2/1988 United Kingdom ................. 359/871

Primary Examiner—Loha Ben
Assistant Examiner—Thomas Robbins
Attorney, Agent, or Firm—Evenson, McKeown, Edwards & Lenahan

[57] ABSTRACT

An external mirror assembly for vehicles, which can be fastened to a fixture on the bodywork side and which exhibits a mirror casing in which a mirror glass is securable to a holding part. The mirror casing, following the fitting of the holding part to the vehicle, can be pushed over the holding part and can be detachably secured in an end position.

10 Claims, 2 Drawing Sheets

EXTERNAL MIRROR FOR VEHICLE

BACKGROUND AND SUMMARY OF THE INVENTION

The invention relates to an external mirror for vehicles.

From German Patent Document DOS 32 48 759, a kit for vehicle external mirrors is known, comprising a mirror casing which receives a holding part for a mirror glass and also the mirror glass. The mirror casing is hinge-secured by means of a pin and two articulated arms, to a supporting part, which is fastened in turn to the body panel of the vehicle. When this mirror casing is fastened by means of the supporting part to the body panel, the vehicle mirror is already fully made up from the mirror casing, the mirror glass and the holding part. A replacement of one of these parts generally, for time reasons, results in a replacement of the entire vehicle mirror.

For the different models of a motor vehicle, auto companies and customer service outlets often have to store numerous different variations of an external mirror which differ in the mechanics or only, indeed, in the color of the mirror casing. In the case of external mirrors which are already fully assembled, the number of different mechanical embodiments is multiplied by the number of possible mirror casing colors. The high number of possible combinations gives rise to equally high storage costs.

An object of the invention is to reduce the storage costs for an external mirror which fits onto a variety of vehicles and to facilitate its repair.

The object is achieved according to preferred embodiments of the invention by providing an arrangement including:
- a holding part attachable to a fixture on a vehicle bodywork part,
- a separate mirror casing surrounding the holding part, and
- a mirror glass securable to the holding part,
- wherein the mirror casing can be pushed over the holding part and can be detachably secured in an end position following the fitting of the holding part supporting the mirror glass to the vehicle.

As a result of the retrospective fitting of the mirror casing to the holding part which is already secured on the vehicle and which bears the mirror glass and the aggregate parts for the pivoting of the mirror glass, there is no need for every external mirror in every possible combination of mirror mechanism and mirror casing color to be stocked. For each vehicle, the desired mirror mechanics are fitted to the holding part and then to the vehicle and a mirror casing suitable for this vehicle is then detachably fixed thereto. If a fault subsequently occurs in the mirror mechanics or following breakage of the mirror glass, the mirror casing can be pulled off and access is gained to the mirror mechanics. Following repair, the same mirror casing can be re-used.

If according to certain preferred embodiments, a cover plate, pointing in the same direction as the body panel, is formed onto or fastened to the holding part, which cover plate fills the cross-section of that end opening of the mirror casing pointing at the body panel, then the mirror casing, after it has been pushed onto the holding part and fixed in place, is also closed off on this side and offers no insight into the interior of the mirror casing in the case of an external mirror which can be swung to one side. Moreover, the mechanics of the external mirror are protected from this side against spraywater.

The mirror casing can easily be detachably secured, in certain preferred embodiments, by at least one leaf spring to the holding part or to some other suitable structural part of the vehicle. This can be a leaf spring which lies with a bent surface pre-tensioned between a surface of a structural part and a surface of the mirror casing or, indeed, a leaf spring which is displaceably mounted upon the cover plate on the holding part and which, in the locking position, projects into a catch in the mirror casing. This leaf spring, which is displaceable along the cover plate, can be actuated from the cavity of the mirror casing through an opening in the cover plate, as a result of which the catch-locking of the mirror casing to the fitted external mirror can be disabled. The displacement of the leaf spring from its locking position can be achieved by the leaf spring partially covering the opening in the cover plate and, for example through the rotation of a screwdriver inserted therein, being able to be pushed out of this covering position and out of the catches on the mirror casing. In the case of a mirror glass which is pivotable in the mirror housing, it is advantageous, in order to prevent it being operated improperly, for the opening in the cover plate to become visible only when the pivotable mirror glass is in a pivotable end position when the external mirror is fitted.

Around the fixture on the vehicle, a sealing strip can be fastened, which surrounds the hinge joint between the fastening to the body panel and the cover plate and protects it from damage. In addition, a sealing strip of this type can be colored differently from the mirror casing, so that any slight color difference which occurs between the mirror casing and the vehicle color is not so obvious.

Other objects, advantages and novel features of the present invention will become apparent from the following detailed description of the invention when considered in conjunction with the accompanying drawings.

DETAILED DESCRIPTION OF THE DRAWINGS

Figure 1:
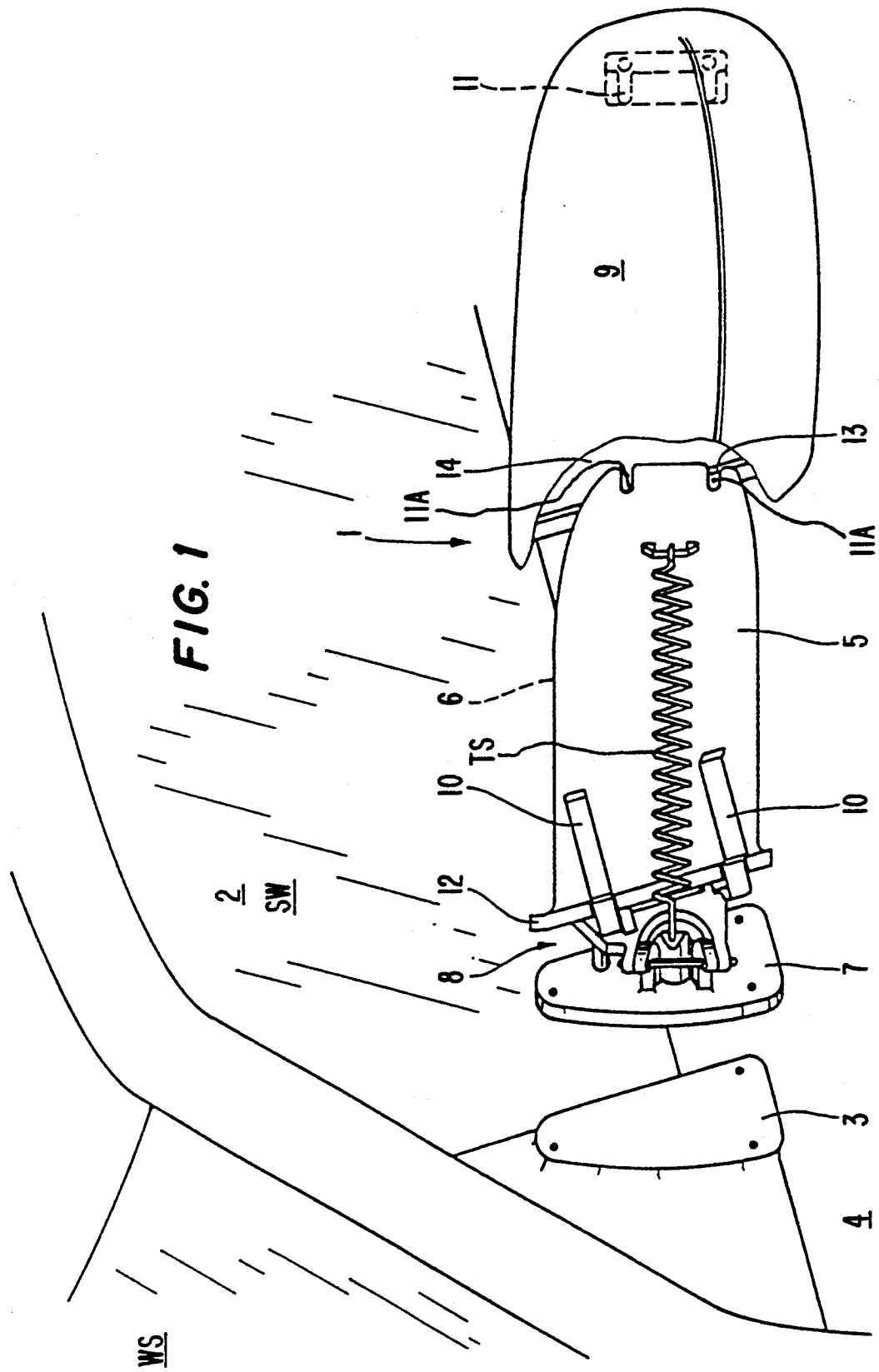
FIG. 1 is a schematic side view of the rear of the assembly parts of an external mirror in the process of being secured to a vehicle, constructed according to a preferred embodiment of the invention.

FIG. 1 depicts an external mirror 1 in the process of being fitted to a vehicle 2, which mirror is fastened to a fixture 3 of a body panel 4. Vehicle 2 has a front windshield WS and a side window SW. Forming part of the external mirror 1 is a holding part 5, on the front side of which a mirror glass 6 (not visible here) is secured. The holding part 5 also supports those aggregates (not represented in the drawing) which are necessary for the pivoting or adjustment of the mirror glass 6. The holding part 5 is connected by screws or bolts and a fastening plate 7 to the vehicle 2. Holding part 5 is connected to the fastening plate 7 by means of a hinge joint 8 and a tension spring TS, which, as and when required, allows swivelling of the holding part 5 on the vehicle 2. Following the securement of the holding part 5 to the vehicle 2, a mirror casing 9 is pushed over the holding part 5 and, in its end position, catch-locked to the latter. This is effected by means of two leaf springs 10 on the holding part 5, which twist the mirror casing 9 in relation to the holding part 5. At the same time, the free end of the holding part 5 travels into a catch-locking fixture 11 in the mirror casing 9 so that the mirror casing 9 then sits detachably fixed on the holding part 5. The fixture 11 slidably engages counter openings 11A on the holding part 5.

Perpendicularly to the longitudinal extent of the holding part 5, there protrudes from this a cover plate 12 which points in the same direction as the body panel 4 and which fills the cross-section of that end opening 13 of the mirror casing 9 pointing at the body panel 4 and thereby closes off on this side the cavity 14 of the mirror casing 9 and protects it from penetration by, for example, spraywater.

Figure 2:
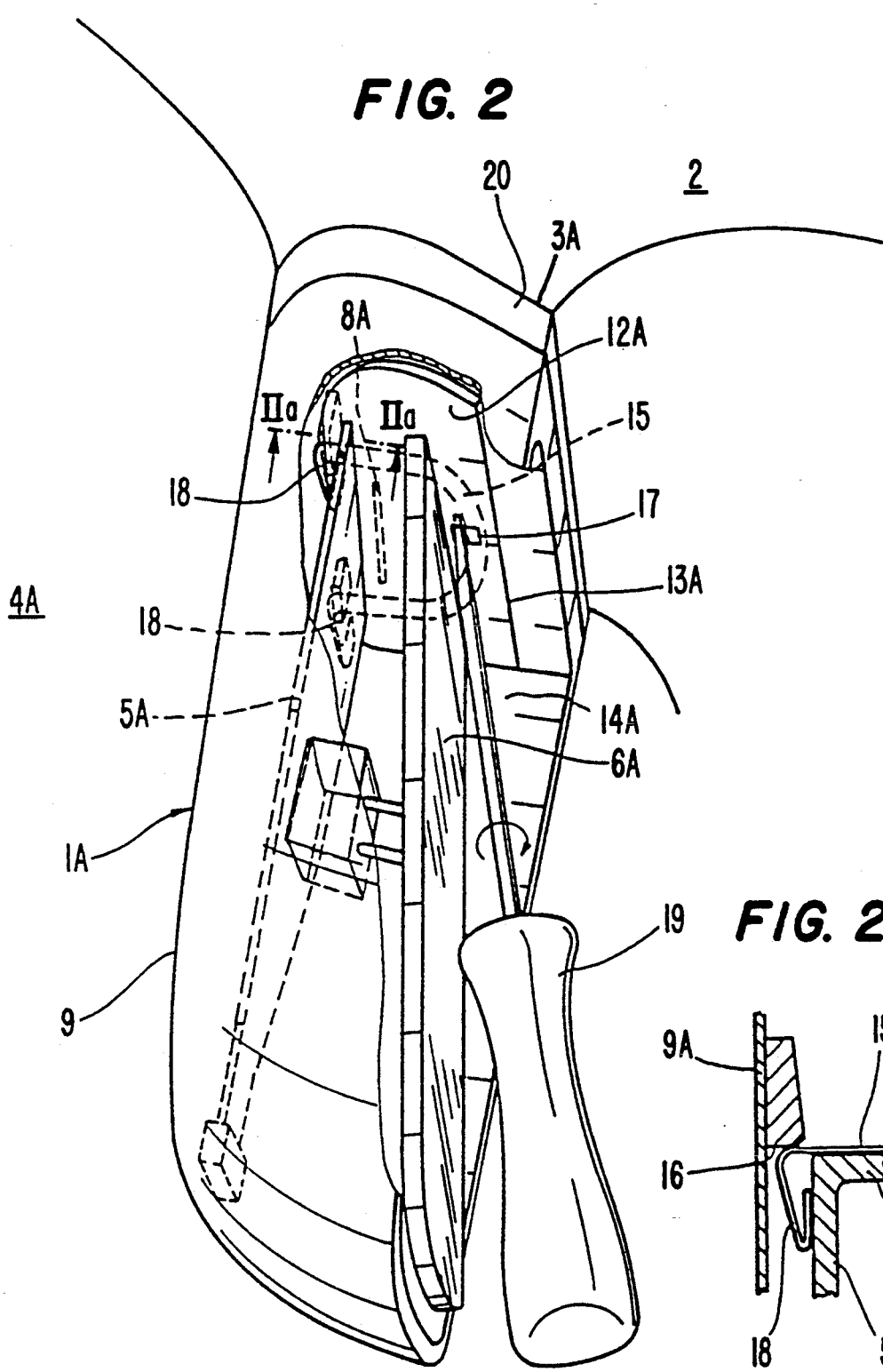
FIG. 2 is a schematic top view of an external mirror at the start of the disassembly of the mirror casing, constructed according to another preferred embodiment of the invention.
Figure 2A:
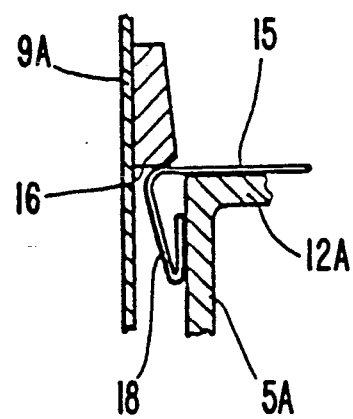
FIG. 2a is a partial sectional view taken along line IIa—IIa in FIG. 2 and showing the catch-locking of the mirror casing to the holding part.

FIGS. 2 and 2a depict a further catch-locking option for the mirror casing 9A, which can be pushed onto the holding part 5A and can be subsequently be catch-locked. In this case, along the cover plate 12A on the side of the body panel 4A, a leaf spring 15 is displaceably held, which acts in the locking position upon a catch 16 on the mirror casing 9A and which can be actuated from the cavity 14A of the mirror casing 9A through an opening 17 in the cover plate 12A, as a result of which the catch-locking of the mirror casing 9A is disabled. The U-shape configured leaf spring 15 exhibits, at both leg ends, a triangular fold-over 18, which draws the leaf spring 15 into the locking position. In addition, the leaf spring 15 partially covers the opening 17. If an actuating means 19, here in the form of a screwdriver, is introduced from the cavity 14A of the mirror casing 9A into the free opening 17 and subsequently twisted, then the leaf spring 15 is moved to the side, the end-side fold-overs 18 are elastically compressed and the mirror casing 9A released from its catch-locking. Afterwards the leaf spring 15 moves back into its locking position and, for renewed catch-locking of the mirror casing 9A, can be pushed to the side again. In order to prevent non-authorized actuation of the leaf spring 15, it is advantageous if the opening 17 in the cover plate 12, when the external mirror 1A is fitted, only becomes visible when the pivotable mirror glass 6A is in a pivotal end position.

Around the fixture 3A on the vehicle 2A, a sealing strip 20 is in this case fastened, which surrounds the hinge joint 8A and is connected to the body panel 4A and to the mirror casing 9A. This plastic sealing strip 20 firstly protects the hinge joint, gives rise to a simple, feasible design of the mirror casing 9A in this area and also bridges over any color differences which might arise between the body panel 4A and the mirror casing 9A.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. External mirror assembly for vehicles comprising:
a mirror glass support subassembly including:
(i) a mirror glass holding part attachable to a fixture on a vehicle bodywork part, and
(ii) a mirror glass securable to the holding part independently and separately from any exterior mirror casing, and
a separate exterior mirror casing which can be pushed over the mirror glass support subassembly and be detachably secured thereto subsequent to and separately from attachment of the mirror glass support subassembly to the vehicle bodywork part;
wherein the mirror casing can be detachably fixed by at least one leaf spring to the holding part or to a vehicle body panel of the vehicle; and
wherein said at least one leaf spring includes a leaf spring disposed along a cover plate on the side of the body panel, which leaf spring acts upon a catch on the mirror casing which is actuable from a cavity of the mirror casing through an opening in the cover plate, as a result of which a catch-locking of the mirror casing can be disabled.

2. External mirror assembly according to claim 1, wherein the leaf spring partially covers the opening in the cover plate and can be pushed out of this covering position by an actuating member.

3. External mirror assembly according to claim 1, wherein the leaf spring if of U-shaped configuration and engages with both legs into respective catches on the mirror casing.

4. External mirror assembly according to claim 1, wherein the mirror glass is a pivotable mirror glass, and wherein the opening in the cover plate only becomes visible when the pivotable mirror glass is in a pivotal end position when the external mirror is fitted.

5. External mirror assembly according to claim 2, wherein the leaf spring is of U-shaped configuration and engages with both legs into respective catches on the mirror casing.

6. External mirror assembly for vehicles comprising:
a holding part attachable to a fixture on a vehicle bodywork part,
a separate mirror casing surrounding the holding part, and
a mirror glass securable to the holding part,
wherein the mirror casing can be pushed over the holding part and can be detachably secured following the fitting of the holding part supporting the mirror glass to the vehicle,
wherein the mirror casing can be detachably fixed by at least one leaf spring to the holding part or to a vehicle body panel of the vehicle, and
wherein said at least one leaf spring includes a leaf spring disposed along a cover plate on the side of the body panel, which leaf spring acts upon a catch on the mirror casing which is actuable from a cavity of the mirror casing through an opening in the cover plate, as a result of which a catch-locking of the mirror casing can be disabled.

7. External mirror assembly according to claim 6, wherein the leaf spring partially covers the opening in the cover plate and can be pushed out of this covering position by an actuating member.

8. External mirror assembly according to claim 6, wherein the leaf spring is of U-shaped configuration and engages with both legs into respective catches on the mirror casing.

9. External mirror assembly according to claim 6, wherein the mirror glass is a pivotable mirror glass, and wherein the opening in the cover plate only becomes visible when the pivotably mirror glass is in a pivotal end position when the external mirror is fitted.

10. External mirror assembly according to claim 7, wherein the leaf spring is of U-shaped configuration and engages with both legs into respective catches on the mirror casing.

* * * * *